US012668125B2

(12) United States Patent
Owens

(10) Patent No.: US 12,668,125 B2
(45) Date of Patent: Jun. 30, 2026

(54) ELECTRONIC VEHICLE STEERING ACCESSORY

(71) Applicant: Maxwell Holloway Owens, Charlotte, NC (US)

(72) Inventor: Maxwell Holloway Owens, Charlotte, NC (US)

(73) Assignee: Maxwell Holloway Owens, Charlotte, NC (US)

( * ) Notice: Subject to any disclaimer, the term of this patent is extended or adjusted under 35 U.S.C. 154(b) by 0 days.

(21) Appl. No.: 18/588,700

(22) Filed: Feb. 27, 2024

(65) Prior Publication Data

US 2024/0286485 A1      Aug. 29, 2024

Related U.S. Application Data

(60) Provisional application No. 63/487,086, filed on Feb. 27, 2023.

(51) Int. Cl.
B60K 35/21 (2024.01)
B60K 35/10 (2024.01)
(Continued)

(52) U.S. Cl.
CPC ............ B60K 35/212 (2024.01); B60K 35/10 (2024.01); B60K 35/25 (2024.01); B60K 35/81 (2024.01);
(Continued)

(58) Field of Classification Search
CPC ........ B60K 35/00; B60K 35/10; B60K 35/22; B60K 35/50; B60K 35/53; B60K 35/60; B60K 2360/128; B60K 2360/139; B60K 2360/1438; B60K 2360/1442; B60K 2360/685; B60K 2360/782; B60K 2360/816; B60K 35/212; B60K 35/25; B60K 35/81; B60K 2360/589; B60R 11/0235; B60R 11/0252; B60R 21/2032;
(Continued)

(56) References Cited

U.S. PATENT DOCUMENTS 9,193,375 B2 * 11/2015 Schramm ............... B60K 35/00
2016/0375924 A1 * 12/2016 Bodtker .............. B60R 11/0252
74/552

(Continued)

FOREIGN PATENT DOCUMENTS

WO      WO-2021010780 A1 *  1/2021

OTHER PUBLICATIONS

English translation of WO 2021010780 A1 (Year: 2021).*

*Primary Examiner* — Nelson M Rosario
(74) *Attorney, Agent, or Firm* — Brian J. Colandreo; Jeffrey T. Placker; Holland & Knight LLP

(57) ABSTRACT

An electronic vehicle steering accessory may include a body portion including an external surface; an electronic display screen positioned on the external surface of the body portion; and a computing device at least partially positioned within an interior of the body portion. The computing device may be communicatively coupled to the electronic display screen and configured to communicate with an external electronic device. The body portion may be removably couplable to a steering input and the computing device may be configured to render customizable content on the electronic display screen.

16 Claims, 7 Drawing Sheets

(51) Int. Cl.
    *B60K 35/25*         (2024.01)
    *B60K 35/81*         (2024.01)
    *G06F 3/14*          (2006.01)

(52) U.S. Cl.
    CPC .......... *G06F 3/14* (2013.01); *B60K 2360/128*
        (2024.01); *B60K 2360/589* (2024.01); *B60K*
        *2360/782* (2024.01)

(58) Field of Classification Search
    CPC .............. B60R 21/2035; B60R 21/215; B60R
        2011/001; B62D 1/046; B62D 1/105;
        G06F 3/14
    See application file for complete search history.

(56)           References Cited

U.S. PATENT DOCUMENTS

2020/0406955 A1*  12/2020  Tan ...................... B62D 5/0409
2022/0379946 A1*  12/2022  Tochev ................... B62D 5/04

* cited by examiner

600

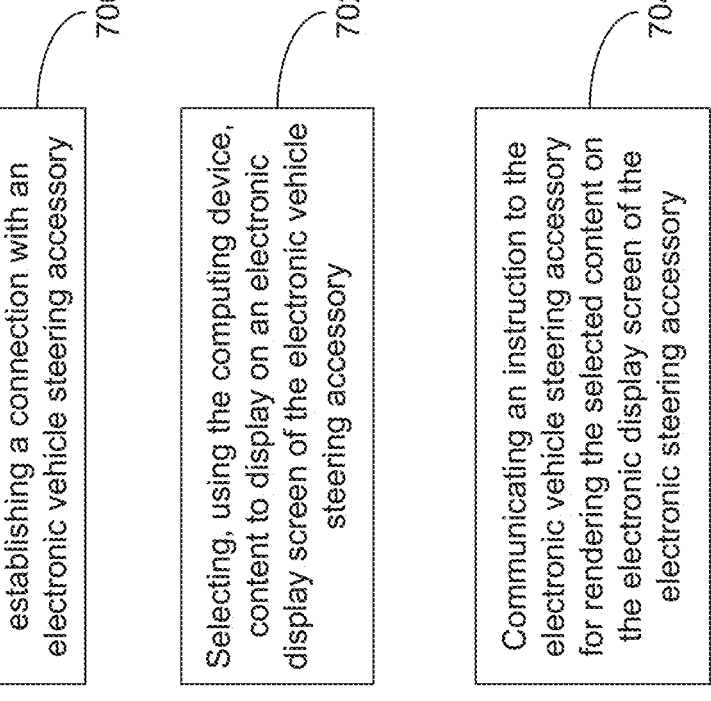

establishing a connection with an electronic vehicle steering accessory

700

Selecting, using the computing device, content to display on an electronic display screen of the electronic vehicle steering accessory

702

Communicating an instruction to the electronic vehicle steering accessory for rendering the selected content on the electronic display screen of the electronic steering accessory

ELECTRONIC VEHICLE STEERING ACCESSORY

CROSS REFERENCE TO RELATED APPLICATIONS

The present application claims priority to U.S. Patent Application No. 63/487,086 that was filed on Feb. 27, 2023, entitled "Customizable Steering Wheel" which is hereby incorporated by reference in its entirety.

BACKGROUND

Vehicle enthusiasts have found every way to modify their vehicles. One part in particular, the steering knob, is a common modification that vehicle owners make to their vehicles. Changing the steering knob can lead to performance improvements as well as cosmetic enhancements. However, conventional steering knobs are unable to provide dynamic content or customization.

SUMMARY

In one embodiment, an electronic vehicle steering accessory may include a body portion including an external surface. The electronic vehicle steering accessory may include an electronic display screen positioned on the external surface of the body portion. A computing device may be at least partially positioned within an interior of the body portion. The computing device may be communicatively coupled to the electronic display screen and configured to communicate with an external electronic device. The body portion may be removably couplable to a steering input and the computing device may be configured to render customizable content on the electronic display screen.

One or more of the following features may be included. One or more buttons may be positioned on the external surface of the body portion and may be communicatively coupled to the computing device. An audio system may be positioned on the body portion and may be communicatively coupled to the computing device. The electronic display screen may be at least partially recessed within the body portion and may form at least a portion of the external surface of the body portion. The computing device may include a global positioning system (GPS). The computing device may include a wireless communication transceiver. The wireless communication transceiver may enable wireless communication between the computing device and the external electronic device. The external electronic device may be a mobile phone and the computing device may be configured to render call information on the electronic display screen. A vibration motor may be communicatively coupled to the computing device and configured to provide vibrations to the body portion.

In another embodiment, an electronic vehicle steering accessory may include a body portion including an external surface. The electronic vehicle steering accessory may also include an electronic display screen at least partially recessed within the body portion forming at least a portion of the external surface of the body portion. A computing device may be positioned at least partially within an interior of the body portion. The computing device may be communicatively coupled to the electronic display screen and may be configured to communicate with an external electronic device. The body portion may be removably couplable to a steering input. The computing device may be configured to render customizable content on the electronic display screen.

One or more of the following features may be included. One or more buttons may be positioned on the external surface of the body portion and may be communicatively coupled to the computing device. An audio system may be positioned on the body portion and may be communicatively coupled to the computing device. The electronic display screen may be at least partially recessed within the body portion and may form at least a portion of the external surface of the body portion. The computing device may include a global positioning system (GPS). The computing device may include a wireless communication transceiver. The wireless communication transceiver may enable wireless communication between the computing device and the external electronic device. The external electronic device may be a mobile phone and the computing device may be configured to render call information on the electronic display screen. A vibration motor may be communicatively coupled to the computing device and configured to provide vibrations to the body portion.

In yet another embodiment, a computer-implemented method may be executed on a computing device. The computer-implemented method may include establishing a connection with an electronic vehicle steering accessory. The method may also include selecting, using the computing device, content to display on an electronic display screen of the electronic vehicle steering accessory. Further, the method may also include communicating an instruction to the electronic vehicle steering accessory for rendering the selected content on the electronic display screen of the electronic vehicle steering accessory.

BRIEF DESCRIPTION OF THE DRAWINGS

Embodiments of the present disclosure are described with reference to the following figures.

FIG. 7 is a flow chart of one implementation of the content management process.

Like reference symbols in the various drawings may indicate like elements.

DETAILED DESCRIPTION OF EXAMPLE EMBODIMENTS

Figure 1:
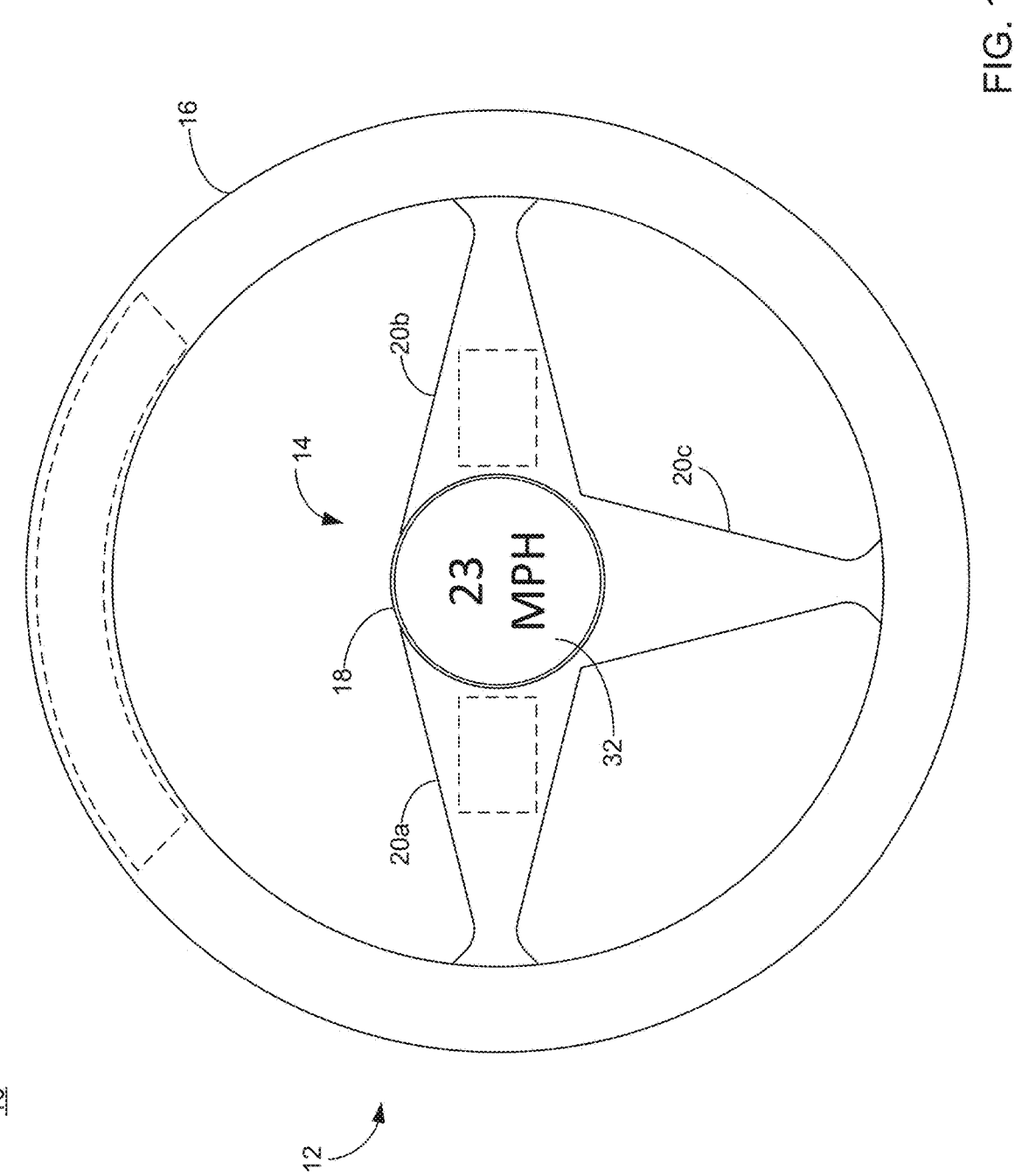
FIG. 1 is a front view of an electronic vehicle steering accessory according to an embodiment of the present disclosure.

Consistent with the present disclosure, in some embodiments an electronic vehicle steering accessory may be provided that utilizes a digital screen to display customizable digital media. In some embodiments, users are able to connect an external electronic device to the electronic vehicle steering accessory and wirelessly customize the media (i.e., images, videos, graphics, animations, etc.) that is being displayed on the electronic vehicle steering accessory using an application. In some embodiments, not only may the electronic vehicle steering accessory provide vehicle customizing and personalization in and of itself, but further the electronic vehicle steering accessory may allow users to quickly and easily personalize the interior of their vehicle. For example, such additional personalization of the interior of their vehicle may be achieved, at least in part, through the customized digital media that may be displayed or provided through the electronic vehicle steering accessory. In addition to cosmetic personalization, according to some embodiments, the electronic vehicle steering accessory may also add functionality to the vehicle. For example, some embodiments of the electronic vehicle steering accessory may allow it to function as a controller for various applications. Using different touch gestures and/or buttons on the electronic vehicle steering accessory, various controls ranging from playing/changing music, to answering calls, reading texts out loud, may be performed using the electronic vehicle steering accessory. In some embodiments, the electronic vehicle steering accessory may also include speakers that are capable of playing custom audio at different times. In some such examples, the user can set their electronic vehicle steering accessory to play a particular audio file when the vehicle turns on, when they receive a call, etc. In one example, playing loud noises through the electronic vehicle steering accessory speakers, along with an optional built-in GPS may also help vehicle owners find their car, for example if the owner has forgotten where they parked in a large parking lot. In some embodiments, the electronic vehicle steering accessory may also use vibrations to do things like indicate when to steering, or to notify the driver of a received text message, as well as providing various additional and/or alternative notification (e.g., which may be customizable). In one example, the electronic vehicle steering accessory can function as a race timer that tracks the time that it takes for a vehicle to race around a track or to go from 0-60 miles per hour.

Referring to FIGS. 1-6, according to an illustrative example embodiment, an electronic vehicle steering accessory may include a body portion including an external surface. An electronic display screen may be positioned on an external surface of the body portion. A computing device may be positioned at least partially within an interior of the body portion. The computing device may be communicatively coupled to the electronic display screen and may be configured to communicate with an external electronic device. The body portion may be removably couplable to a steering input and the computing device may be configured to render customizable content on the electronic display screen.

In some embodiments, an electronic vehicle steering accessory may include a body portion including an external surface and an interior chamber. Referring also to FIG. 1, an electronic vehicle steering accessory (e.g., electronic vehicle steering accessory 10) is shown. Electronic vehicle steering accessory 10 includes a body portion (e.g., body portion 12, generally) including an external surface (e.g., external surface 14, generally). Consistent with the illustrated example embodiment, the body portion 12 may include a rim portion 16 connected to a central hub 18 by spokes 20a-20c. While the illustrated embodiment is shown including three spokes connecting the rim and hub, it will be appreciated that other numbers and configurations of spoke may be utilized (e.g., two spokes, four spokes, etc.). Similarly, the shape and configuration of the hub and the spokes may vary according to design preference. For example, the hub may include a generally rectangular, square, oval, trapezoidal, etc., shape and the spoke may have various configurations (e.g., an eccentric arrangement, and H-shaped arrangement, and the like). As such, the shape and configuration of the illustrated hub and spokes should not be construed as a limitation on the present disclosure. The body portion 12 may be formed from any variety of suitable materials, including combinations of different materials. For example, the rim, spokes, and hub may be formed from plastic, metal metal-alloy, wood, etc., as well as combinations thereof. For example, the rim may include a metal or plastic structure (including, e.g., a metal hoop over-molded with a plastic material), which may, in some implementations be wrapped in another material (e.g., carbon fiber, leather, plastic, faux leather, suede, etc.). In a similar manner, the spokes may include a metal or plastic structure (or combinations thereof, such as metal over-molded with plastic), which may additionally be wrapped in another material (such as leather, suede, faux leather, carbon fiber, etc.). The hub may also include similar materials and/or combinations of materials.

The external surface (e.g., external surface 14) may be smooth or textured. Additionally, different portions of the exterior surface (e.g., the exterior surfaces of the rim, spokes, and hub) may include different textures. For example, the external surface of the rim may be smooth, and/or have a textured surface to improve grip (e.g., as may be provided by a leather or suede wrapping), while the spokes may have a polished metal surface. As such, it will be appreciated that external surface 14 may include a combination of different textures and/or surface materials Referring also to FIGS. 2A and 2B, the electronic vehicle steering accessory may include a computing device (e.g., computing device 22, generally) as well as various electronic components to enable operation of an electronic display, as well as providing various additional and/or alternative functionality (as discussed in greater detail below). Consistent with some embodiments, the vehicle steering accessory may include one or more interior chambers (e.g., interior chamber 24, generally) that may form a hollow portion, or cavity, to house the computing device 22 and/or one or more of the electronic components. Additionally and/or alternatively, the computing device and/or one or more of the electronic components may be molded into (e.g., encapsulated by) one or more of the rim, the spokes, and the hub of the electronic vehicle steering accessory.

In some embodiments, the electronic vehicle steering accessory may include a power port (e.g., power port 26) configured to provide power from an external source (e.g., a vehicle power supply or any other type of power supply) to the computing device 22 and/or other electronic components. It should be noted that while the computing device 22, various electronic components, and the power port 26 are shown associated with the hub, this is for illustrative purposes only, as one or more of the computing device 22, power port 26 and other electronic components may variously be contained in and/or associated with the rim, the spokes and the hub (including different components being associated with different features of the electronic vehicle steering accessory). In some implementations, body portion 12 includes a data port configured to provide a data connection from an external electronic device to the computing device within electronic vehicle steering accessory 10 (e.g., contained within interior chamber 24). In one example, the power port and the data port are defined in the same port structure (e.g., power port 26). An example of power port 26 includes a universal serial bus (USB) type "C" port. However, it will be appreciated that any type of power and/or data port may be used within the scope of the present disclosure.

Figure 2:
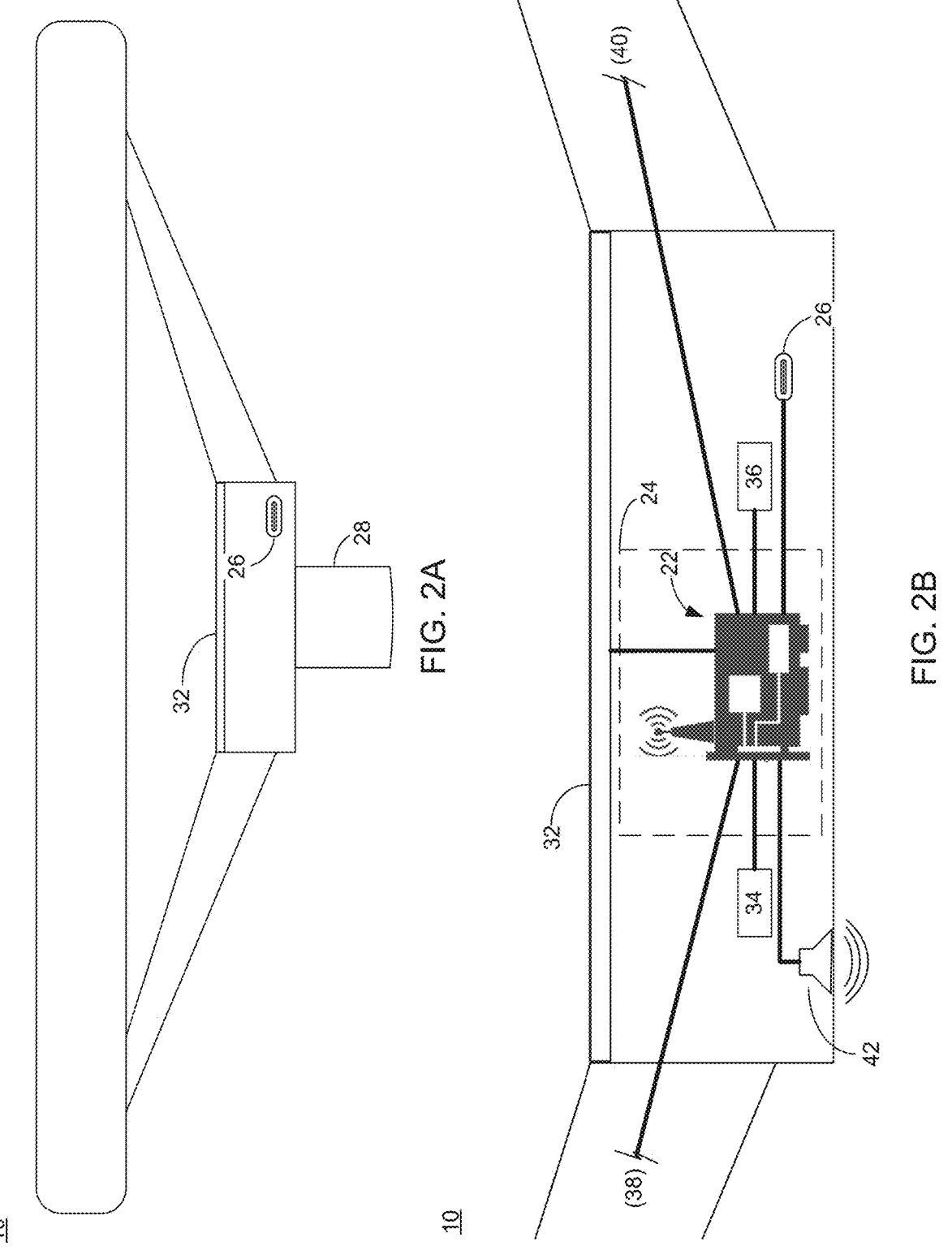
FIG. 2A is a side view of an electronic vehicle steering accessory according to an embodiment of the present disclosure.
FIG. 2B is a detailed view of a hub portion of the electronic vehicle steering accessory of FIG. 2A.
Figure 3:
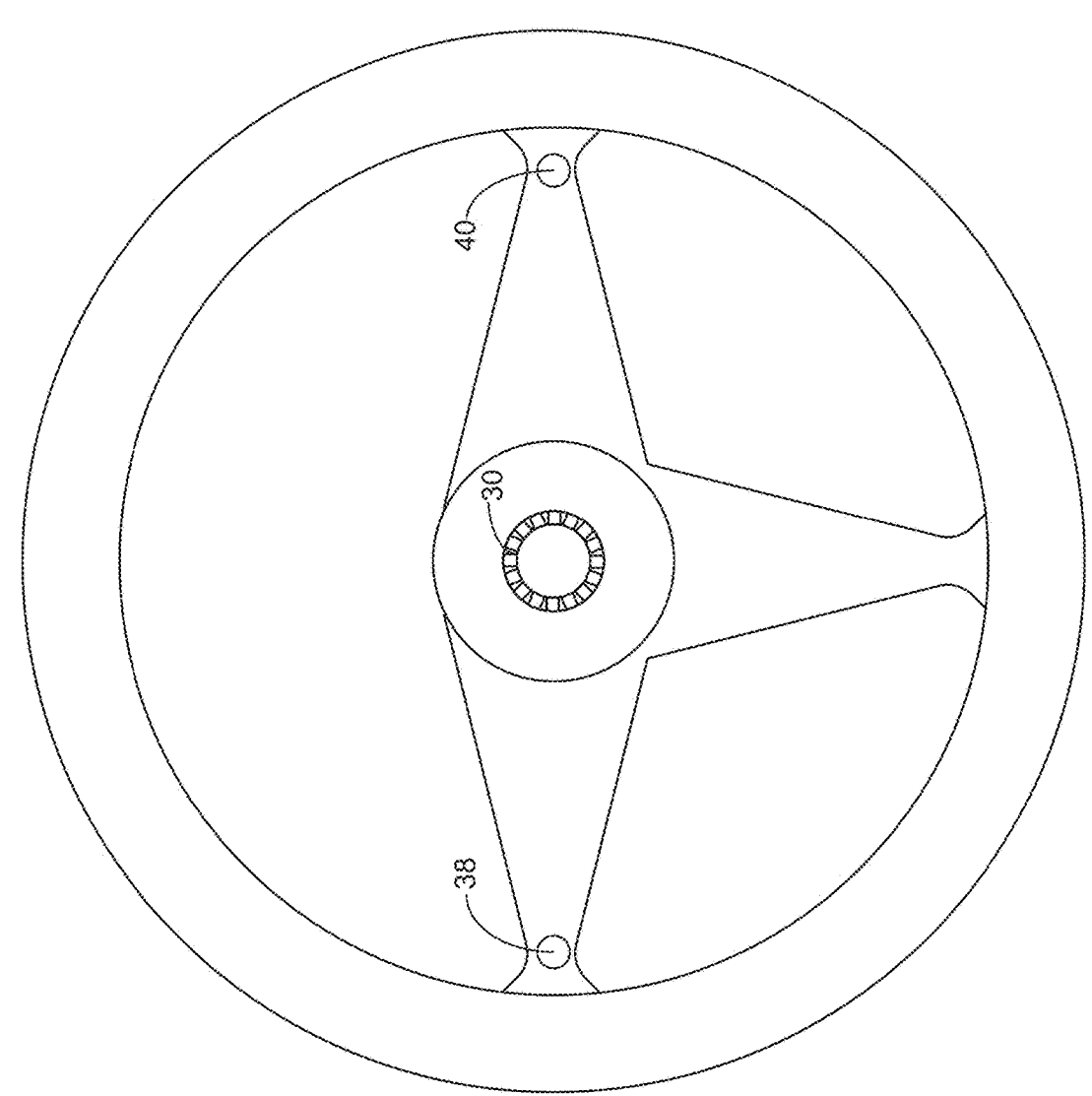
FIG. 3 is a rear view of an electronic vehicle steering accessory according to an embodiment of the present disclosure.

In some implementations, body portion 12 may be removably couplable to a steering input (e.g., steering input shaft 28). A steering input shaft (e.g., gear selector 28) may generally include a shaft physically coupled or electronically coupled to a vehicle's steering system for providing directional control of the vehicle. Referring also to FIG. 3, a bottom view of electronic vehicle steering accessory 10 is shown with a coupling mechanism (e.g., coupling mechanism 30) for removably coupling to a steering input shaft (e.g., steering input shaft 28 in FIG. 2A). In one embodiment, coupling mechanism is a splined opening that received a corresponding splined portion of steering input shaft to provide rotational coupling between the electronic vehicle steering accessory and a vehicle steering system. Additionally, the steering input shaft may further be coupled with the electronic vehicle steering accessory with a nut to retain the electronic vehicle steering accessory to the steering input shaft. However, it will be appreciated any fastener or coupling system may be used to removably couple body portion 12 to the steering input shaft 28 within the scope of the present disclosure.

In some embodiments, the electronic vehicle steering accessory may include an electronic display screen positioned on the external surface of the body portion. Referring again to FIG. 1, an electronic display screen (e.g., electronic display screen 32) is positioned on the external surface (e.g., external surface 14). Electronic display screen 32 may generally include a display device for presentation of images, text, and/or video transmitted electronically. Electronic display screen may be a liquid crystal display (LCD) or an organic light emitting diode (OLED) display. In some implementations, electronic display screen 32 may be at least partially recessed within body portion 12 forming at least a portion of external surface 14 of body portion 12. For example, as shown in the illustrated example embodiment, the electronic display screen may be positioned on an external surface of the hub 18. However, in other embodiments, the electronic display screen may be positioned on the rim 16 and/or on one or more of the spokes 20a-20c (as shown in broken lines in FIG. 1). Additionally, in some embodiments, more than one electronic display screen may be included, e.g., with one or more electronic display screen being positioned on the rim 16, the hub 18 and one or more of the spokes. Referring also to FIGS. 2A and 2B, electronic display screen 32 is shown at least partially recessed within an upper external surface of body portion 12 (e.g., of hub 18 in the illustrated example embodiment). In this example, electronic display screen 32 forms the top surface of hub portion 18 of the electronic vehicle steering accessory 10. In some embodiments, electronic display screen 32 may include a touch screen. For example, electronic display screen 32 can receive touch gestures to operate particular menus, features, etc. (e.g., change music, answer phone calls, etc.).

In some embodiments, the electronic vehicle steering accessory may include a computing device positioned within the interior chamber of the body portion. A computing device (e.g., computing device 22 shown in FIG. 2B) may generally include an electronic instrument with a central processing unit (CPU) configured to perform substantial computations, including numerous arithmetic operations and logic operations without human intervention. In some embodiments, computing device 22 can be a standalone unit or may be one of several interconnected units. In some embodiments, computing device 22 may be communicatively coupled to electronic display screen 32 and configured to communicate with an external electronic device. Communicatively coupled generally includes a wired or wireless connection between two devices and may be a direct coupling between the devices or an indirect coupling through intervening devices. For example, computing device 22 may interface with electronic display screen 32 by generating and sending signals to electronic display screen 32 that cause electronic display screen 32 to generate particular images, text, videos, etc.

Figure 4:
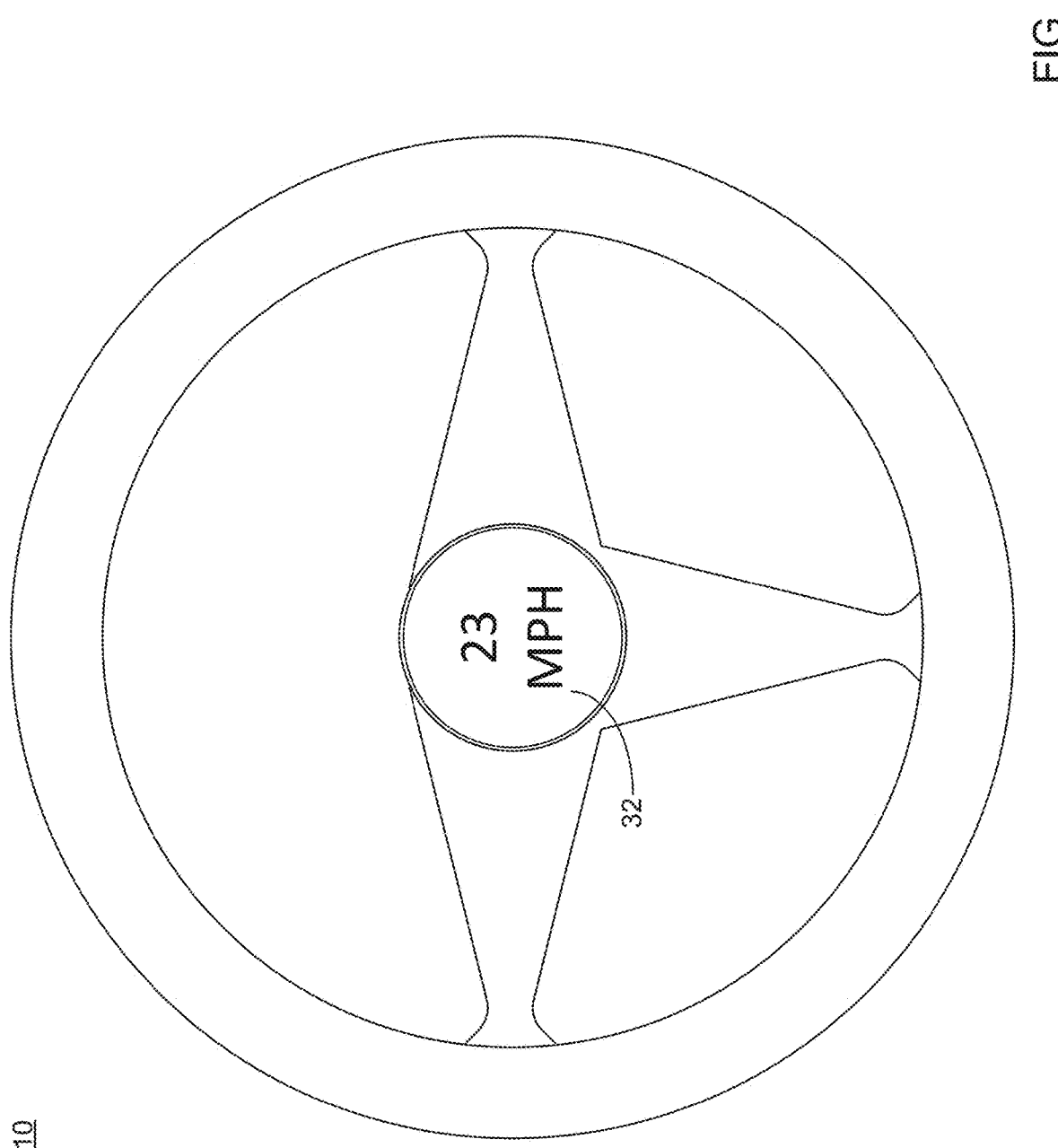
FIG. 4 is a top view of an electronic vehicle steering accessory according to an embodiment of the present disclosure.
Figure 5:
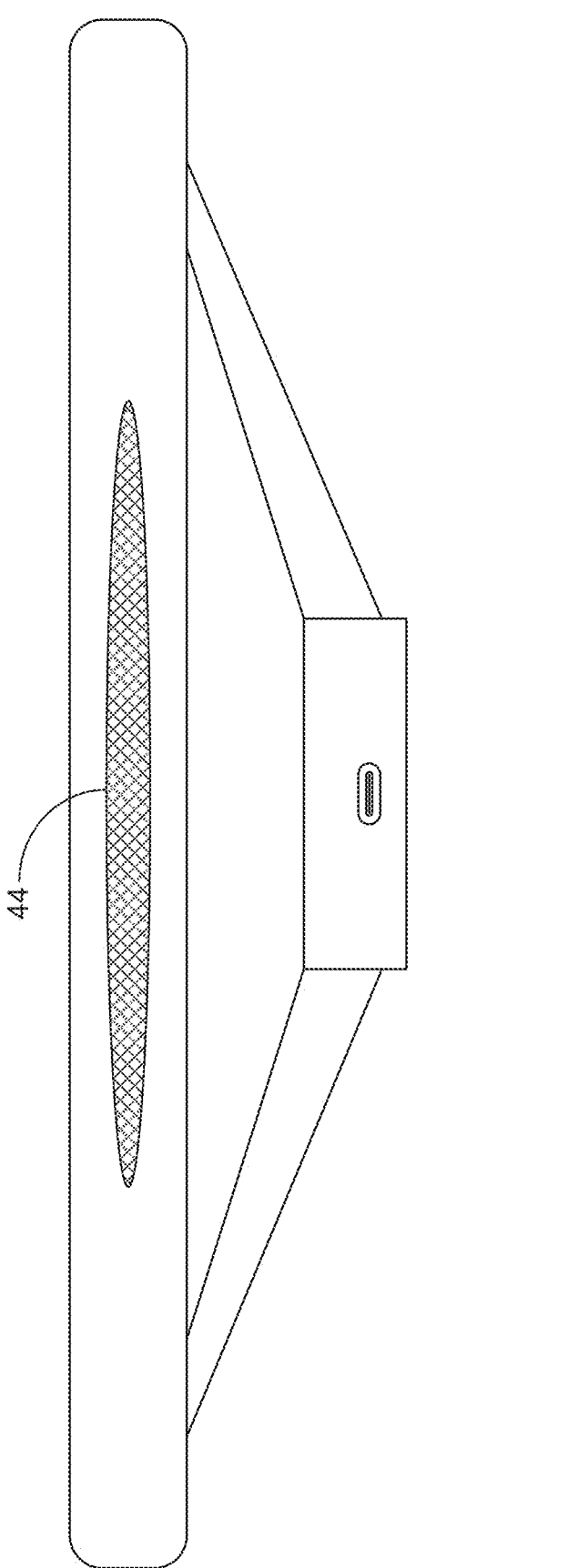
FIG. 5 is a side view of the electronic vehicle steering accessory according to an embodiment of the present disclosure.

In some embodiments, computing device 22 allows users to personalize the content displayed in electronic display screen 32. For example, computing device 22 may include an application that provides multiple options for content to display using electronic display screen 32. In one example, computing device 22 includes a memory that is programed with predefined types of content that a user can select (using input controls on electronic vehicle steering accessory 10 and/or using an external electronic device). In another example, computing device 22 includes a memory that is programmable with content uploaded from an external electronic device. In this example, content may be uploaded using a wired connection (e.g., using port 26) and/or a wireless connection (e.g., Bluetooth®, W-Fi®, etc.). In another example, computing device 22 may access content stored in a remote storage location (e.g., a cloud storage device and/or an external electronic device). In this example, computing device 22 can access content from various sources. As will be discussed in greater detail below, computing device 22 may provide various functionality in addition to display particular content on electronic display screen 32. In one example, computing device 22 interfaces with a vehicle management system and/or a GPS chipset to determine the speed of the vehicle and to cause the vehicle speed to be displayed on electronic display screen 32 as shown in FIG. 4. However, it will be appreciated that various types of content concerning the operation of a vehicle (e.g., current speed, warnings, tripmeter information, alerts, transmission steering recommendations, etc.) may be rendered on electronic display screen 32.

In some embodiments, the computing device may include a global positioning system (GPS). For example, computing device 22 may include a GPS chipset (e.g., GPS 34) integrally within computing device 22 or as a separate component (e.g., GPS 34) communicatively coupled to computing device 22 (as shown in FIG. 2). In some embodiments, computing device 22 may interface with GPS 34 to determine location information for electronic vehicle steering accessory 10. For example, computing device 22 may receive a request from an external electronic device to provide location information for electronic vehicle steering accessory 10. Accordingly, computing device 22 may energize GPS 34 to obtain location information for electronic vehicle steering accessory 10. In some embodiments, computing device 22 may periodically energize GPS 34 to determine and store location information for electronic vehicle steering accessory 10 based upon, at least in part, a location information gathering interval. The location information gathering interval may be a default interval or a user-defined interval. For example, the location information gathering interval may be defined using electronic display screen 32 and/or an external electronic device. In one example, computing device 22 may interface with an application executing on an external electronic device to determine location information for electronic vehicle steering accessory 10. For example, computing device 22 may be configured to periodically, or upon request, determine location information for a group of vehicles and to communicate the location information to an external electronic device. In this manner, GPS 34 may provide location information as part of a vehicular fleet management application. However, it will be appreciated that GPS 34 may be used to provide location information for electronic vehicle steering accessory 10 for various applications within the scope of the present disclosure.

In some embodiments, the computing device may include a wireless communication transceiver. A wireless communication transceiver (e.g., wireless communication transceiver 36) may generally include electronic components that receive and transmit wireless communications. Examples of wireless communications include cellular signals (e.g., 3G, 4G, or 5G broadband cellular network technology), IEEE 802.11a, 802.11b, 802.11g, 802.11n, Wi-Fi, and/or Bluetooth. In some embodiments, wireless communication transceiver 36 may enable wireless communication between computing device 22 and an external electronic device. For example, the external electronic device may be a mobile phone and computing device 22 may be configured to render call information on electronic display screen 32. In another example, the external electronic device may be a vehicle management system and computing device 22 may be configured to render vehicle operation information by communicating wirelessly with the vehicle management system using wireless communication transceiver. In one example, wireless communication transceiver 36 of electronic vehicle steering accessory 10 enables communication (e.g., via Bluetooth) between an external sensor (e.g., an oil temperature sensor) and computing device 22 of electronic vehicle steering accessory 10 such that electronic display screen 32 displays information from the external sensor (e.g., oil temperature information).

In some embodiments, the electronic vehicle steering accessory may include one or more buttons positioned on the external surface of the body portion and communicatively coupled to the computing device. Referring also to FIG. 3, one or more buttons (e.g., buttons 38, 40) may be positioned on external surface 14 of body portion 12. For example, in the illustrated example embodiment, the buttons may be disposed on a rear surface of the spokes adjacent to the rim of the electronic steering accessory. As such, the buttons may be readily accessible by a user while steering a vehicle using the electronic steering accessory. However, it will be appreciated that the buttons may be otherwise located. For example, the buttons may be on a front surface of the spokes, may be on the hub, and/or may be on the rim of the electronic steering accessory. Further, it will be appreciated that more than one set of buttons may be included, and may be variously positioned on the rim, the spokes, and/or on the hub, including various combinations of such locations. Buttons 38, 40 may be communicatively coupled to computing device 22 to provide interactive control between a user and the content displayed on electronic display screen 32. For example, using buttons 38, 40 a user may select particular content to render on electronic display screen 32. In some embodiments, computing device 22 may provide a menu on electronic display screen 32 and a user may select particular options or features on the menu using buttons 38, 40.

In some embodiments, the electronic vehicle steering accessory may include an audio system positioned on the body portion and communicatively coupled to the computing device. Referring again to FIG. 2B, electronic vehicle steering accessory 10 may include an audio system (e.g., audio system 42) positioned on body portion 12. While audio system 42 is shown associated with the hub portion in the illustrated example embodiment, it will be appreciated that the audio system may additionally and/or alternatively be associated with one or more of the rim and the spokes of the electronic vehicle steering accessory. Audio system 42 may be communicatively coupled to computing device 22. For example, computing device 22 may provide signals to audio system 42 to play sounds or music. In one example, computing device 22 interfaces with a vehicle management system and/or GPS 34 to determine a user's speed and/or when a user needs to undertake other operations concerning the vehicle. Accordingly, computing device 22 communicates with audio system 42 to provide a predefined sound or portion of music. The sound may be a default sound or a user-defined sound. In some embodiments, computing device 22 communicates with audio system 42 to provide audible feedback while using electronic vehicle steering accessory (e.g., in response to selecting content for rendering on electronic display screen 32, steering the vehicle consistent with navigation instructions. In some embodiments, audio system 42 may provide any sound or music associated with the rendered content from electronic display screen 32. In one example, audio system 42 may provide sound signals from a call processed using electronic vehicle steering accessory. For instance, audio system 42 may include a microphone and a speakerphone combination to allow a user to receive calls using the electronic vehicle steering accessory. As such, it will be appreciated that audio system may receive input sounds using a microphone assembly and output sounds using a speaker assembly.

In some embodiments, the electronic vehicle steering accessory may include a vibration motor communicatively coupled to the computing device and configured to provide vibrations to the body portion. For example, electronic vehicle steering accessory 10 may include a vibration motor (e.g., vibration motor 44) configured to provide vibration feedback. It will be appreciated that while, in the illustrated example embodiment, the vibration motor 44 is shown within the rim of the electronic vehicle steering accessory, this is for illustrative purposes only. The vibration motor may additionally and/or alternatively be associated with one or more of the spokes and the hub of the electronic vehicle steering accessory. In some embodiments, computing device 22 may be configured to energize vibration motor 44 to provide different types of vibration feedback to body portion 12. In one example, computing device 22 energizes vibration motor 44 when a call is received by an external electronic device in communication with electronic vehicle steering accessory 10. In another example, computing device 22 may energize vibration motor 44 when a navigational system (e.g., within electronic vehicle steering accessory 10 or an external electronic device) determines that a user is approaching a change in direction during guided navigation. In some implementations, different types of vibrations (e.g., duration and pulse) may be provided to communicate different information. For example, one type of vibration feedback may be associated with receiving a call (e.g., vibration for phone ringing); another type of vibration for indicating when to change gear (e.g., upshifting or downshifting); and another type of vibration for processing alerts or warnings from the vehicle. In this manner, it will be appreciated that various types of vibrations may be used within the scope of the present disclosure for different applications.

As discussed above, electronic vehicle steering accessory 10 may enable a user to interact with external electronic devices (e.g., mobile phones, external sensors, media players, vehicle management systems, etc.) to perform various functions (e.g., answering phone calls, controlling media playback, adjusting media volume, selecting images for display in the electronic display screen, determine and display temperature, display text messages, open and close garage doors, engage vehicle locks and controls, display compass/navigation features, etc. In this manner, electronic vehicle steering accessory 10 allows simplified access to various electronic tools and services from the convenient location of the vehicle steering accessory.

The Content Management Process

Figure 6:
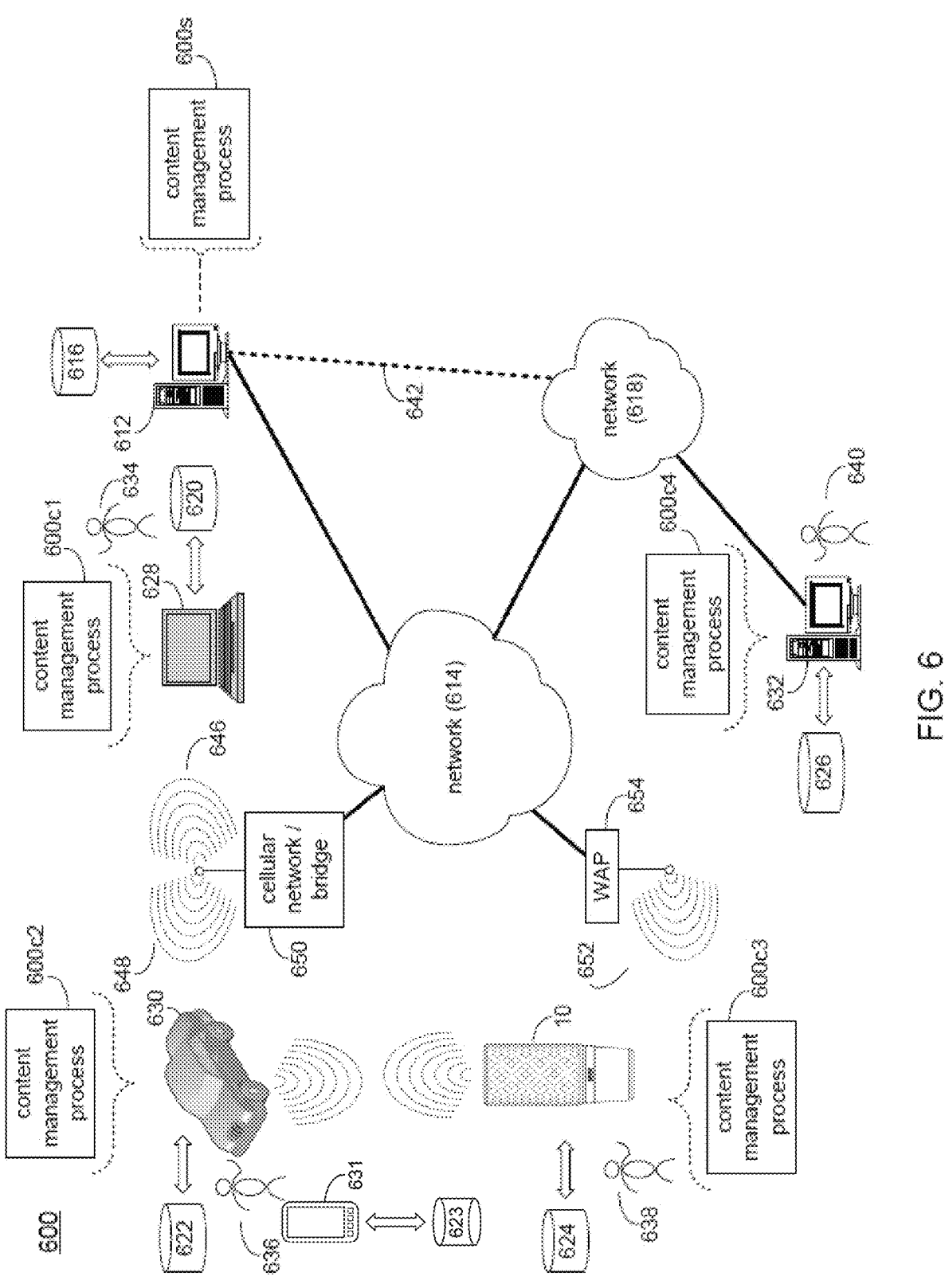
FIG. 6 is a diagrammatic view of computer system and a content management process coupled to a distributed computing network.

Referring to FIG. 6, there is shown content management process 600. Content management process 600 may be implemented as a server-side process, a client-side process, or a hybrid server-side/client-side process. For example, content management process 600 may be implemented as a purely server-side process via content management process 600*s*. Alternatively, content management process 600 may be implemented as a purely client-side process via one or more of content management process 600*c*1, content management process 600*c*2, content management process 600*c*3, and content management process 600*c*4. Alternatively still, content management process 600 may be implemented as a hybrid server-side/client-side process via content management process 600*s* in combination with one or more of content management process 600*c*1, content management process 600*c*2, content management process 600*c*3, and content management process 600*c*4. Accordingly, content management process 600 as used in this disclosure may include any combination of content management process 600*s*, content management process 600*c*1, content management process 600*c*2, content management process 600*c*3, and content management process 600*c*4.

Content management process 600*s* may be a server application and may reside on and may be executed by computing device 612, which may be connected to network 614 (e.g., the Internet or a local area network). Examples of computing device 612 may include, but are not limited to: a personal computer, a server computer, a series of server computers, a minicomputer, a mainframe computer, a smartphone, or a cloud-based computing platform.

The instruction sets and subroutines of content management process 600*s*, which may be stored on storage device 616 coupled to computing device 612, may be executed by one or more processors (not shown) and one or more memory architectures (not shown) included within computing device 612. Examples of storage device 616 may include but are not limited to: a hard disk drive; a RAID device; a random-access memory (RAM); a read-only memory (ROM); and all forms of flash memory storage devices.

Network 614 may be connected to one or more secondary networks (e.g., network 618), examples of which may include but are not limited to: a local area network; a wide area network; or an intranet, for example.

Examples of content management processes 600*c*1, 600*c*2, 600*c*3, 600*c*4 may include but are not limited to a web browser, a game console user interface, a mobile device user interface, or a specialized application (e.g., an application running on e.g., the Android™ platform, the iOS™ platform, the Windows™ platform, the Linux™ platform or the UNIX™ platform). The instruction sets and subroutines of content management processes 600*c*1, 600*c*2, 600*c*3, 600*c*4, which may be stored on storage devices 620, 622, 623, 624, 626 (respectively) coupled to client electronic devices 628, 10, 630, 631, 632 (respectively), may be executed by one or more processors (not shown) and one or more memory architectures (not shown) incorporated into client electronic devices 628, 630, 631, 632 (respectively). Examples of storage devices 620, 622, 624, 626 may include but are not limited to: hard disk drives; RAID devices; random access memories (RAM); read-only memories (ROM), and all forms of flash memory storage devices.

Examples of client electronic devices 628, 630, 631, 632 may include, but are not limited to, an electronic vehicle steering accessory 10, an external computing device (e.g., a smartphone 631, a personal digital assistant (not shown), a tablet computer (not shown)), laptop computer 628, vehicle management system 630, personal computer 632, a notebook computer (not shown), a server computer (not shown), a gaming console (not shown), and a dedicated network device (not shown). Client electronic devices 10, 628, 630, 631, 632 may each execute an operating system, examples of which may include but are not limited to Microsoft Windows™, Android™, iOS™, Linux™, or a custom operating system.

Users 634, 636, 638, 640, may access content management process 600 directly through network 614 or through secondary network 618. Further, content management process 600 may be connected to network 614 through secondary network 618, as illustrated with link line 642.

The various client electronic devices (e.g., client electronic devices 10, 628, 630, 631, 632) may be directly or indirectly coupled to network 614 (or network 618). For example, laptop computer 628 and vehicle management system 630 are shown wirelessly coupled to network 614 via wireless communication channels 646, 648 (respectively) established between laptop computer 28 and vehicle management system 630 (respectively) and cellular network/bridge 650, which is shown directly coupled to network 614. Further, electronic vehicle steering accessory 10 is shown wirelessly coupled to network 614 via wireless communication channel 652 established between electronic vehicle steering accessory 10 and wireless access point (i.e., WAP) 654, which is shown directly coupled to network 614. Additionally, personal computer 34 is shown directly coupled to network 618 via a hardwired network connection. Further, client electronic device 631 may be coupled with electronic vehicle steering accessory 10 via a wired or wireless communication channel.

WAP 654 may be, for example, an IEEE 802.11a, 802.11b, 802.11g, 802.11n, Wi-Fi®, and/or Bluetooth® device that is capable of establishing wireless communication channel 652 between electronic vehicle steering accessory 10 and WAP 654. As is known in the art, IEEE 802.11x specifications may use Ethernet protocol and carrier sense multiple access with collision avoidance (i.e., CSMA/CA) for path sharing. As is known in the art, Bluetooth® is a telecommunications industry specification that allows e.g., electronic devices, mobile phones, computers, and personal digital assistants to be interconnected using a short-range wireless connection.

In some implementations, content management process 600 may establish 700 a connection with an electronic vehicle steering accessory 10. For example and as discussed above, content management process 600 may allow an external electronic device (e.g., smartphone 631) to establish 700 a connection (e.g., a wired connection, a cellular connection, a Bluetooth® connection, etc.) with electronic vehicle steering accessory 10. In some implementations, content management process 600 may provide an application that allows electronic vehicle steering accessory 10 to be identified and selected for establishing a connection. In one example, content management process 600 provides a login for securely accessing electronic vehicle steering accessory 10.

In some implementations, content management process 600 may select 702, using the computing device, content to display on an electronic display screen of the electronic vehicle steering accessory. For example, content management process 600 may render an application on the computing device (e.g., external electronic device) with options for different content items for rendering on electronic display screen 32 of electronic vehicle steering accessory 10. In some implementations, content management process 600 may provide an option for uploading content to electronic vehicle steering accessory 10. As discussed above, examples of content may include images, videos, music, etc.

In some implementations, content management process 10 may communicate 704 an instruction to the electronic vehicle steering accessory for rendering the selected content on the electronic display screen of the electronic vehicle steering accessory. For example, after selecting a particular content item on an external electronic device, content management process 600 communicates 704 an instruction to electronic vehicle steering accessory 10 for rendering the selected content on electronic display screen 32. In some implementations, content management process 600 communicates the content along with the instruction to electronic vehicle steering accessory 10 for rendering the content on electronic display screen 32.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. An electronic vehicle steering accessory comprising:
a body portion including an external surface;
an electronic display screen positioned on the external surface of the body portion; and
a computing device at least partially positioned within an interior of the body portion, wherein the computing device is communicatively coupled to the electronic display screen and configured to communicate with an external electronic device;
wherein the body portion is removably couplable to a steering input;
wherein the computing device is configured to render customizable content on the electronic display screen; and
wherein the computing device includes a global positioning system (GPS), wherein the computing device is configured to receive a location request from the external electronic device, and energize the GPS to obtain location information for the electronic vehicle steering accessory responsive to the request from the external electronic device.

2. The electronic vehicle steering accessory of claim 1, further comprising:
one or more buttons positioned on the external surface of the body portion and communicatively coupled to the computing device.

3. The electronic vehicle steering accessory of claim 1, further comprising:
an audio system positioned on the body portion and communicatively coupled to the computing device.

4. The electronic vehicle steering accessory of claim 1, wherein the electronic display screen is at least partially recessed within the body portion and forms at least a portion of the external surface of the body portion.

5. The electronic vehicle steering accessory of claim 1, wherein the computing device includes a wireless communication transceiver.

6. The electronic vehicle steering accessory of claim 5, wherein the wireless communication transceiver enables wireless communication between the computing device and the external electronic device.

7. The electronic vehicle steering accessory of claim 6, wherein the external electronic device is a mobile phone and the computing device is configured to render call information on the electronic display screen.

8. The electronic vehicle steering accessory of claim 1, further comprising:
a vibration motor communicatively coupled to the computing device and configured to provide vibrations to the body portion.

9. An electronic vehicle steering accessory comprising:
a body portion including an external surface;
an electronic display screen at least partially recessed within the body portion forming at least a portion of the external surface of the body portion; and
a computing device at least partially positioned within an interior of the body portion, wherein the computing device is communicatively coupled to the electronic display screen and configured to communicate with an external electronic device;
wherein the body portion is removably couplable to a steering input;
wherein the computing device is configured to render customizable content on the electronic display screen; and
wherein the computing device includes a global positioning system (GPS), wherein the computing device is configured to receive a location request from the external electronic device, and energize the GPS to obtain location information for the electronic vehicle steering accessory responsive to the request from the external electronic device.

10. The electronic vehicle steering accessory of claim 9, further comprising:
one or more buttons positioned on the external surface of the body portion and communicatively coupled to the computing device.

11. The electronic vehicle steering accessory of claim 9, further comprising:
an audio system positioned on the body portion and communicatively coupled to the computing device.

12. The electronic vehicle steering accessory of claim 9, wherein the computing device includes a wireless communication transceiver.

13. The electronic vehicle steering accessory of claim 12, wherein the wireless communication transceiver enables wireless communication between the computing device and the external electronic device.

14. The electronic vehicle steering accessory of claim 13, wherein the external electronic device is a mobile phone and the computing device is configured to render call information on the electronic display screen.

15. The electronic vehicle steering accessory of claim 9, further comprising:

a vibration motor communicatively coupled to the computing device and configured to provide vibrations to the body portion.

16. A computer-implemented method, executed on a computing device, comprising:

establishing a connection with an electronic vehicle steering accessory;

selecting, using the computing device, content to display on an electronic display screen of the electronic vehicle steering accessory;

communicating an instruction to the electronic vehicle steering accessory for rendering the selected content on the electronic display screen of the electronic vehicle steering accessory, wherein the electronic steering accessory includes a global position system, and wherein the selected content to display includes one or more of location information and navigation information;

receiving, from an external computing device, a request to provide location information to the external computing device; and energizing the global positioning system to obtain location information for the vehicle steering accessor; and communicating the location information to the external computing device.

* * * * *